United States Patent [19]
Robinson

[11] Patent Number: 4,632,622
[45] Date of Patent: Dec. 30, 1986

[54] MARINE CARGO TRANSFER DEVICE

[76] Inventor: James S. Robinson, 2421 Westcreek La., Houston, Tex. 77027

[21] Appl. No.: 470,320

[22] Filed: Feb. 28, 1983

[51] Int. Cl.[4] .............................................. B65G 67/62
[52] U.S. Cl. ....................................... 414/139; 212/76
[58] Field of Search ..................... 212/71, 76; 114/268; 414/139

[56] References Cited

U.S. PATENT DOCUMENTS

| | | | |
|---|---|---|---|
| 3,591,022 | 7/1971 | Polyakov et al. | 414/139 X |
| 3,785,511 | 1/1974 | Bonnamy et al. | 414/139 |
| 4,021,019 | 5/1977 | Sanders | 414/137 X |
| 4,025,055 | 5/1977 | Strolenberg | 414/139 X |
| 4,310,277 | 1/1982 | Robinson | 414/139 |

Primary Examiner—Robert J. Spar
Assistant Examiner—Janice Krizek
Attorney, Agent, or Firm—Pravel, Gambrell, Hewitt & Kimball

[57] ABSTRACT

An apparatus for transferring cargo between first and second bodies which are movable relative to each other where a hoist for raising and lowering cargo through a hoist line is mounted on one of the bodies includes a linkage for connecting the two bodies. The linkage is pivotally connected to the bodies for accommodating relative movement between the bodies. A guide is located between the hoist line and one of the bodies for engaging and guiding the hoist line. A trolley which is movable along at least a portion of the linkage engages the hoist line on the side opposite the guide and moves the hoist line along the linkage between the guide and the other body while the line changes length so that cargo connected to the hoist line can be moved along the linkage. The linkage includes a plurality of arms in addition to hydraulic cylinders useful for compensating motion between an articulated connection and a second body.

13 Claims, 13 Drawing Figures

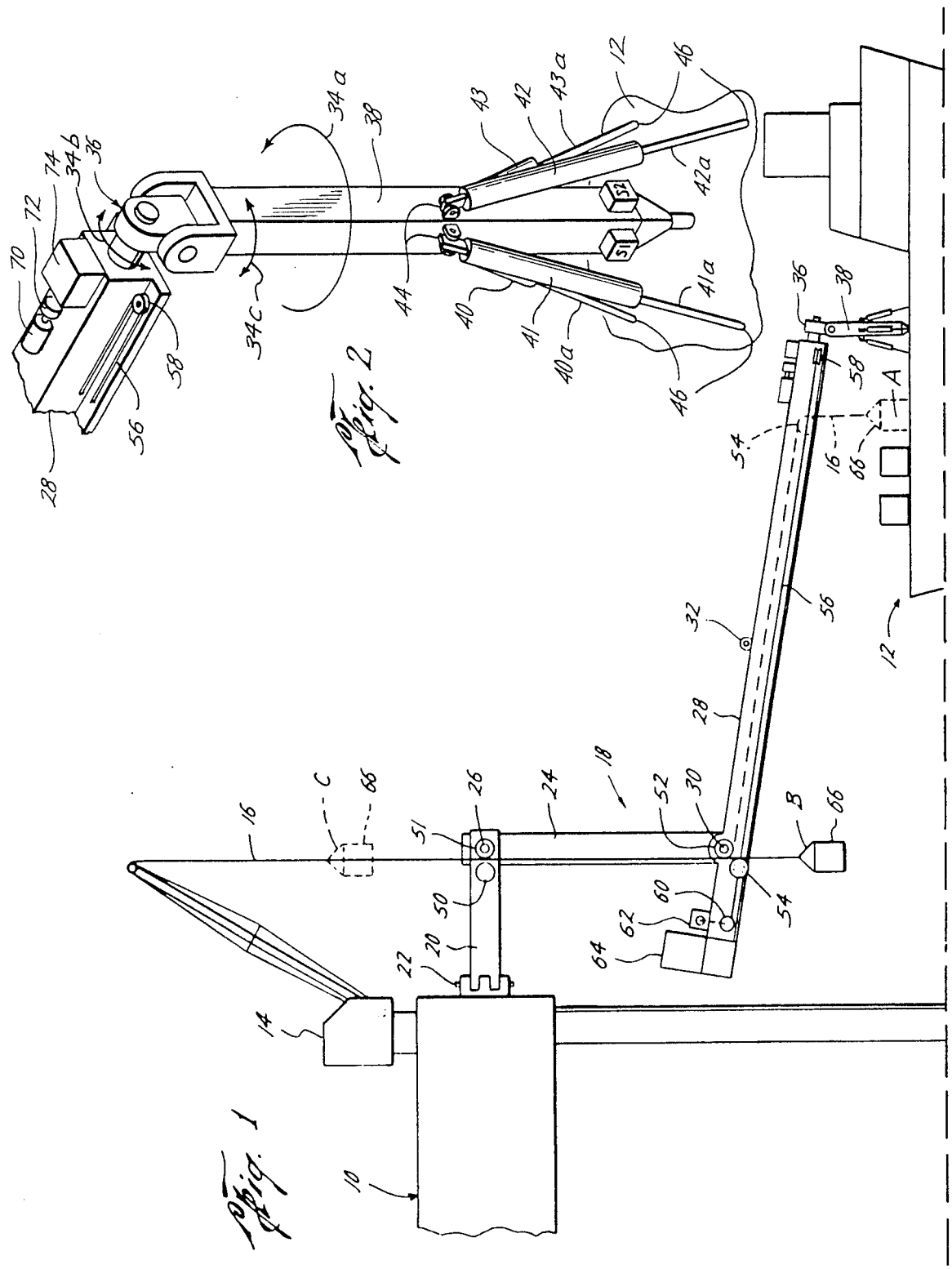

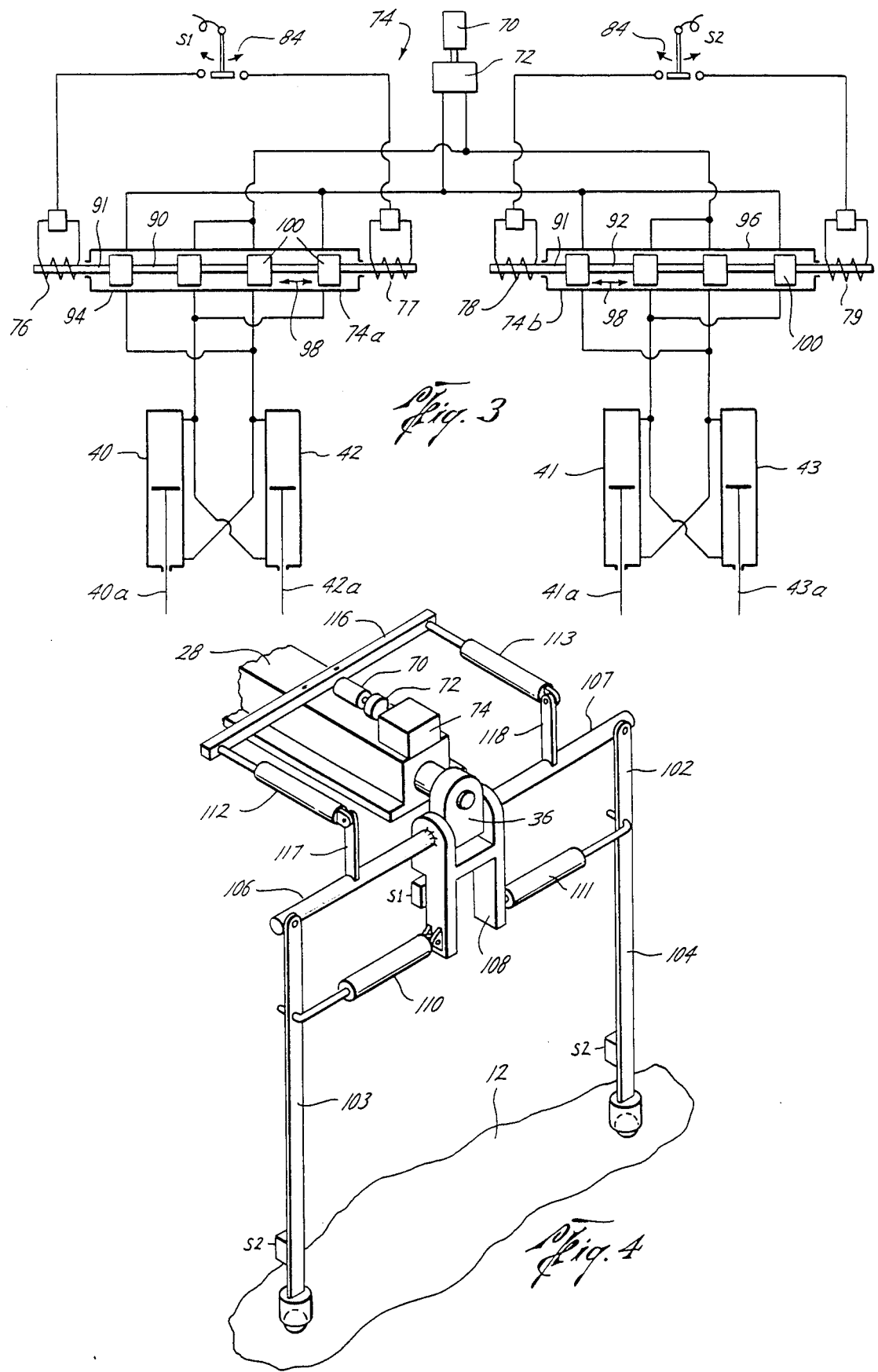

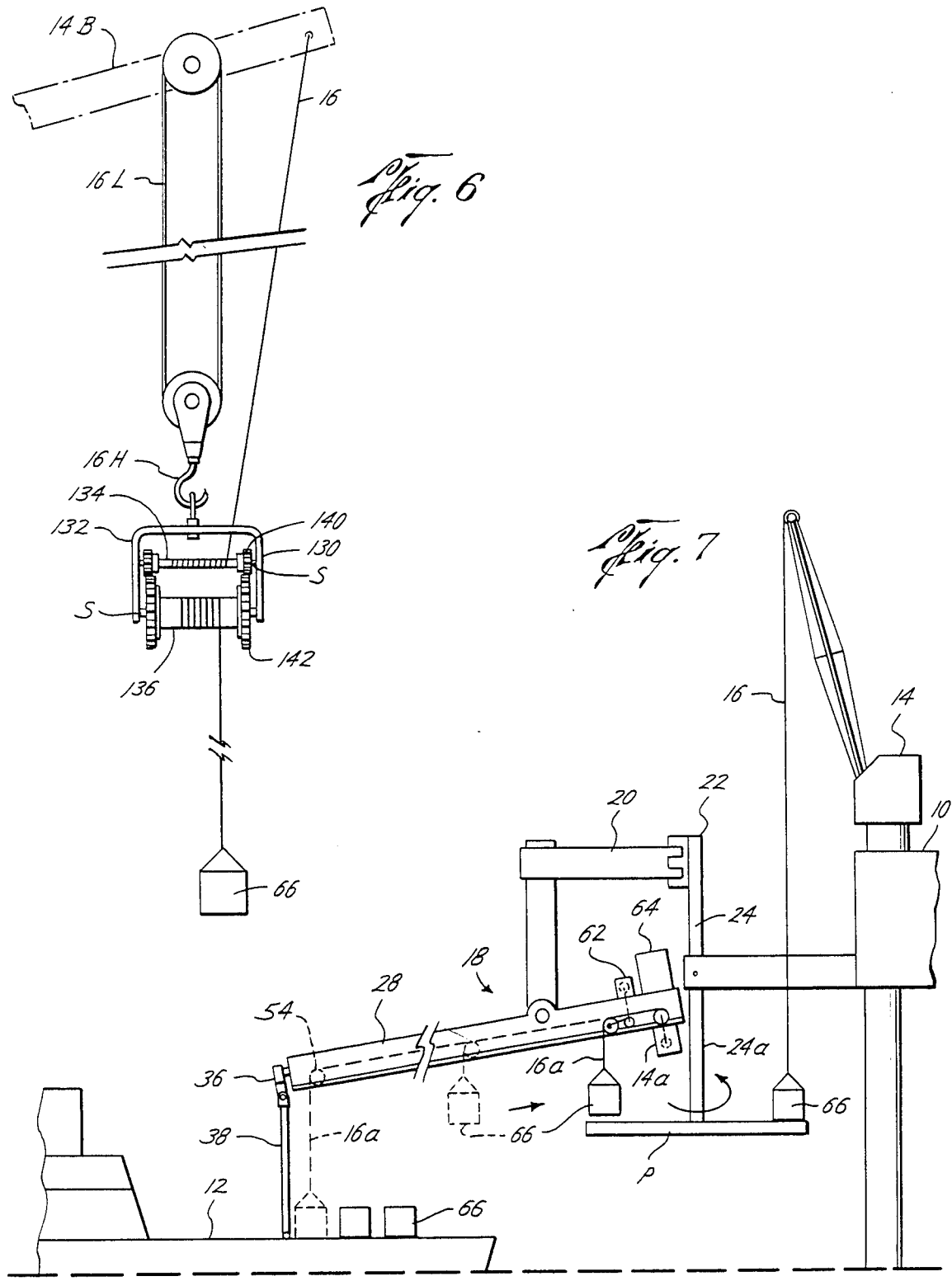

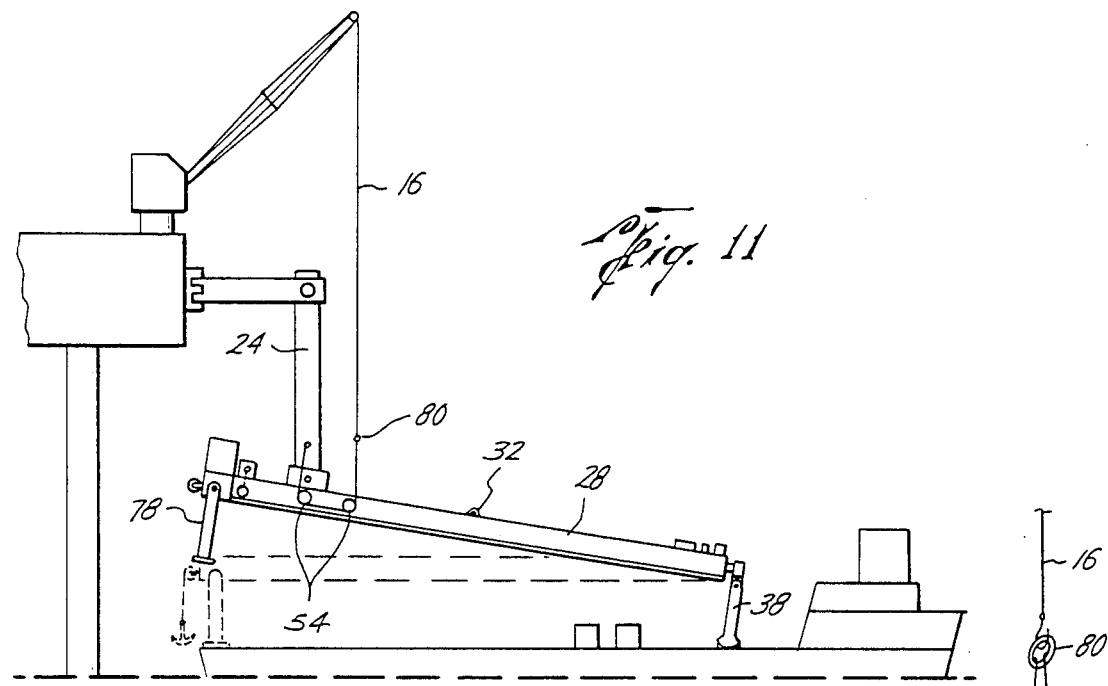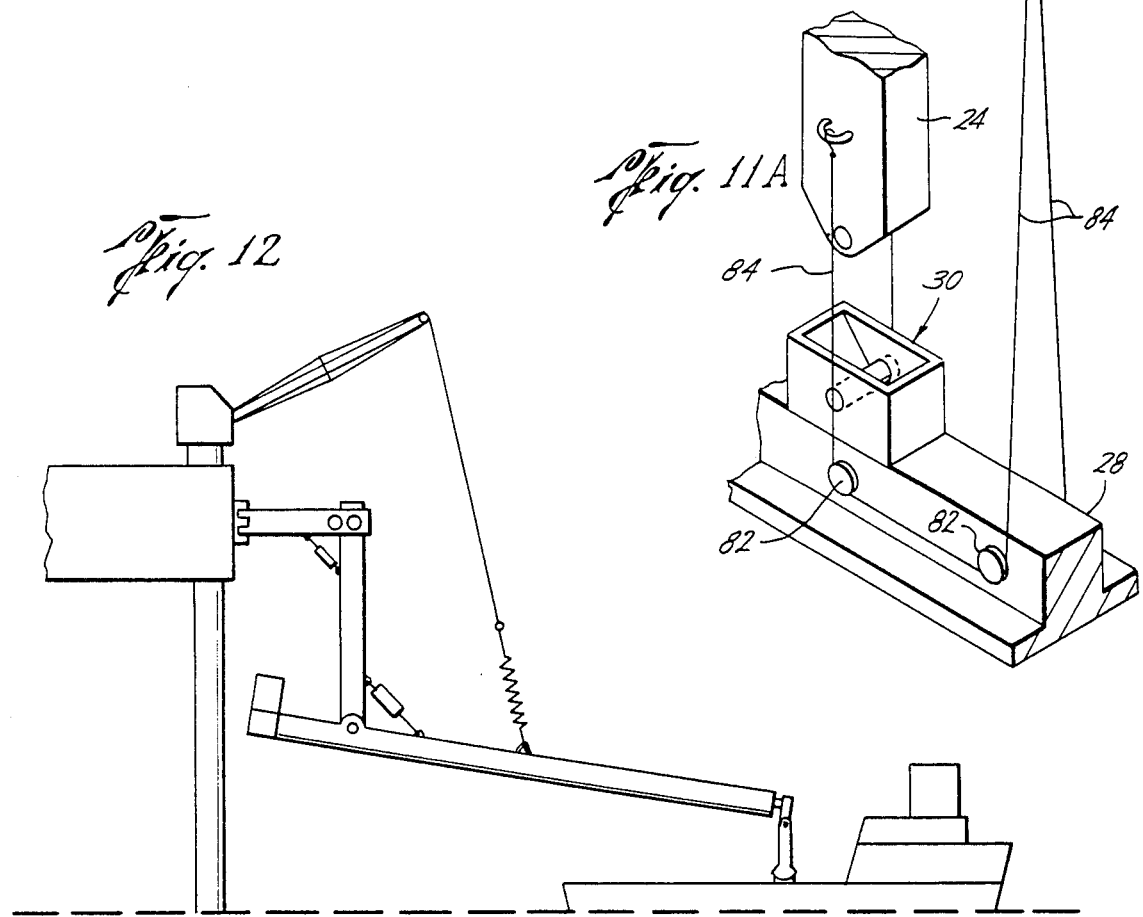

MARINE CARGO TRANSFER DEVICE

BACKGROUND OF THE INVENTION

1. Technical Field

This invention relates to marine cargo transfer devices and, more particularly, to a motion compensation apparatus used in conjunction with a hoist or marine crane for compensating for the relative movement caused by wave motion when cargo is transferred between a vessel and a stationary body such as an offshore drilling platform or dock.

2. General Background

The relative movement caused by wave motion between a vessel and a stationary body such as an offshore drilling platform or dock can create hazardous conditions during loading and unloading operations. This is especially true in less than ideal weather conditions. Unless some compensation is made for the relative movement between the two bodies the risk of bodily injury to crew members and damage to the crane, vessels or cargo is often times unacceptably high. My earlier U.S. Pat. No. 4,310,277 discloses a device useful in this regard, over which the present invention is an improvement.

A device for transferring heavy loads at sea is disclosed in U.S. Pat. No. 3,945,508 where a device for connecting two ships employs an inverted V-shaped cargo boom having one leg mounted on each ship. With such arrangement, however, transfers can only occur during periods of calm seas.

U.S. Pat. Nos. 3,428,194 and 4,027,800 are both directed to marine gantry cranes for handling cargo aboard ship while U.S. Pat. No. 3,757,678 is directed to a marine crane for handling logs. None of these patents deals with connecting two bodies to compensate for relative movement caused by wave motion.

A combined marine ramp transfer and mooring system is illustrated and described in U.S. Pat. No. 4,003,473. The ramp connects the two vessels so that personnel and/or material can travel between the two.

Trolley-type high-line transfer systems between ships are taught in U.S. Pat. Nos. 3,012,518 and 3,787,031 where a high-line cable is connected between ships so that cargo can be transferred.

Motion compensation systems for cranes and other cargo transfer equipment mounted on a vessel have been developed. In U.S. Pat. No. 4,021,019 a heave compensated crane is disclosed for holding a load at a fixed position and in U.S. Pat. No. 3,916,811 a tide compensation system for a vessel is disclosed.

Marine crane motion compensation systems are the subject of U.S. Pat. Nos. 3,591,022; 3,662,991; and 4,126,298 where under rough sea conditions a line connected to the cargo carrying surface of the other vessel in addition to a load carrying line ensures non-impact and precise placement of the cargo. Such a system can be supplemented with means to ensure that the cargo is lifted from the vessel at the wave crest of the relative motion cycle as disclosed in U.S. Pat. No. 4,025,055. Another motion compensator is taught in U.S. Pat. No. 4,174,188 where a supplemental cargo support is mounted on the deck of a vessel and is raised or lowered at an appropriate time for compensating for wave motion.

3. General Discussion of the Present Invention

An apparatus is provided in accordance with the present invention where cargo can be safely transferred between two bodies which are movable relative to each other such as an offshore drilling platform or dock and a vessel, or between a drilling ship and a vessel.

A linkage is connected between the two bodies which accommodates any relative movement between them. The linkage is made up of three arms, a first arm pivotally connected to one of the bodies to accommodate pivotal movement in a horizontal plane, a second being pivotally connected to the first arm at one end and to a third arm at the other end with relative pivotal movement through a vertical plane being accommodated at these latter two pivot points. The outer end of the third arm is connected to the other body through a vertically disposed frame with movable connections between the arm and frame and the frame and vessel which accommodate motion between the body and the linkage including pitching/heaving of the second body, rotation of the second body, and lateral movement of the second body which in the preferred embodiment is compensated to maintain a position of the second body generally proximate and under the outer end of the third arm.

While it is to be understood that the apparatus is applicable to two moving bodies, it is best described and illustrated using it between a stationary body, such as an offshore drilling platform, and a moving body, such as a supply vessel.

A marine crane or hoist on the stationary body has a hoist line which can be moved into and out of engagement with a guide pulley connected to the linkage. A trolley in the form of a movable pulley connected to an endless line, a screw-thread or a cogged-wheel apparatus extending between two stationary rotatable pulleys or drive gears which are mounted on the third arm engages the hoist line on the side opposite where it engages the guide pulley. Movement of the trolley back and forth along the third arm in cooperation with either the reeling in or playing out of the hoist line respectively, depending on whether the hoist line is moving away from or toward the vessel, will operate to move the hoist line and transfer cargo connected to the hoist line along the third arm.

The linkage provides a physical connection between the two bodies and operates as a stable guide for the cargo by compensating for relative movement between them. Utilization of a guide pulley and the trolley in the form of a movable pulley for engaging the hoist line provides a path for the cargo to a point where it can either be lifted vertically away from the influence of the moving vessel or deposited onto the deck of the vessel. Connection of the hoist line to the linkage through the pulleys where the linkage operates as an extension of the deck of the moving vessel allows cargo to be lifted from or deposited on the deck with a minimum of relative movement between the hoist line and deck.

In this way cargo is maintained under control both during the lifting and depositing phases of the operation as well as during transfer from the vessel to the stationary body and vice-versa even under less than ideal weather conditions. There is little danger of the connection between the two bodies breaking since the pivot points of the linkage and its connections to the two bodies compensate for all motions imparted by wave to the vessel. The cargo can be safely transferred between the deck of the vessel and a point where it is beyond the influence of wave motion.

One alternate embodiment shows the apparatus of the present invention with a multi-line/traveling block arrangement for heavy lifts.

In another embodiment, the lift line portion is transported laterally from the platform toward the vessel by a laterally moving sheave assembly carried longitudinally by the third arm.

Another embodiment can be used for transporting lighter loads, mooring lines, personnel baskets and the like between platform and vessel. That embodiment features a lifting sheave movable laterally upon and supported by the third arm.

Another embodiment features a spring loaded lowering device.

Another embodiment shows the apparatus of the present invention featuring a multi-line traveling block.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a side view of the preferred embodiment of the load transfer/motion compensation apparatus of the present invention showing a marine crane and linkage for connecting two relatively movable bodies and transferring cargo between them;

FIG. 2 is a partial perspective view of the frame for connecting the linkage and vessel;

FIG. 3 is a schematic diagram of the hydraulic circuit portion of the preferred embodiment of the apparatus of the present invention;

FIG. 4 is a partial perspective view of an alternate embodiment of the frame for connecting the linkage and vessel;

FIG. 6 is a partial perspective view of the lift cable drum assembly portion of the preferred embodiment of the apparatus of the present invention;

FIG. 7 is an elevational view of an alternate embodiment of the apparatus of the present invention;

FIG. 11 is another embodiment of the apparatus of the present invention providing a detachable arm which can be left on the vessel for performing lifting duties on the vessel such as anchor and buoy lifting and the like;

FIG. 11a is a detail fragmentary view illustrating the detachable connection used in the embodiment of FIG. 11;

FIG. 12 is another embodiment of the apparatus of the present invention using the crane loadline and spring assembly to aid in lowering an attachment of the arm to the vessel deck.

DETAILED DESCRIPTION OF THE PRESENT INVENTION

Figure 5:
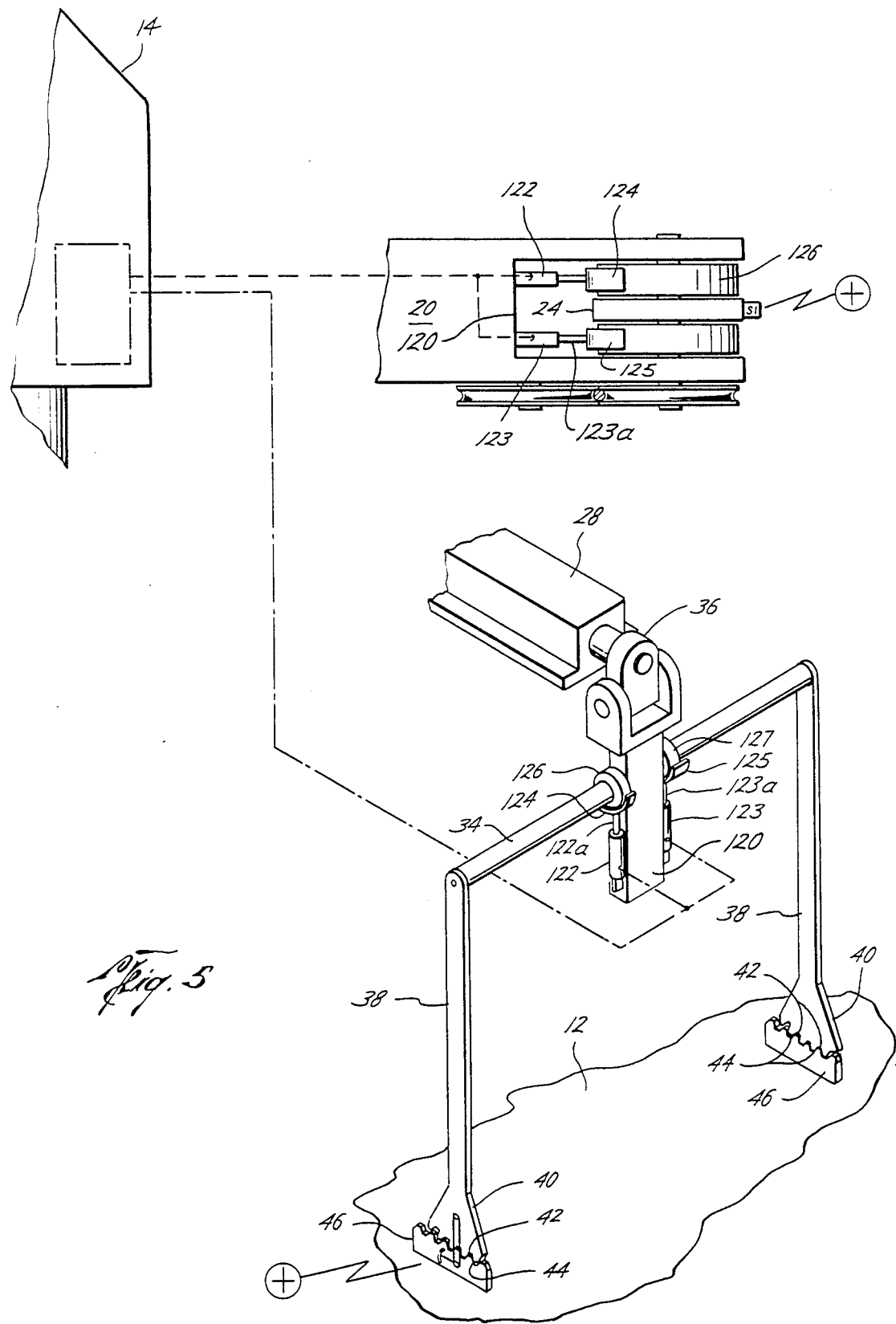
FIG. 5 is a perspective fragmentary and schematic view of another embodiment of the frame for connecting the linkage and vessel.

Referring to FIG. 1, reference numeral 10 designates a stationary body such as, for example, an offshore drilling platform and reference numeral 12 designates a movable body such as, for example, a floating vessel. A suitable lifting means such as a marine crane or hoist 14 is mounted on the platform 10 and includes a hoist line 16 which can be raised and lowered in a way which is known to one with ordinary skill in the art.

During cargo transferring operations the platform 10 is physically connected to the vessel 12 through a linkage which is generally designated by reference number 18. The linkage 18 includes a first arm 20 which is connected to the platform 10 through a pivot pin 22 which will enable the arm 20 to pivotally more relative to the platform 10 through a horizontal plane. A second arm 24 is connected at one end to the first arm 20 through a pivot pin 26 and a third arm 28 through a pivot pin 30, the pivot pins 26 and 30 allowing the second and third arms 24 and 28, respectively, to pivotally move through a vertical plane. The third arm 28 includes a ring 32 which can be engaged by a hook (not shown) on the end of the hoist line 16 for moving the linkage arrangement 18 into position. A spring can be attached to ring 32 to which the hook of a crane can be attached thereby permitting arm 28 to be pulled down until attached to the vessel 12, the pull to be against spring tension compensating for movement of the vessel (see FIG. 12).

The outer end of the third arm 28 is connected to the vessel 12 through a frame shown best in FIG. 2 which includes a leg 38 which is connected to the outer end of the third arm 28 through an articulated connection 36 which enables the leg 38 (and the vessel 12) to rotate as shown by arrows 34a and 34c and to rock as shown by arrow 34b, and to swing with movement of vessel 12 responsive to wave action, tide weather and the like. A plurality of hydraulic cylinders 40–43 are affixed at connections 44 to and radially spaced about leg 38. The opposite end of each cylinder 40–43 attaches to the vessel 12 deck at connection 46 which could be ball and socket-type connection. Sensors S1, S2 which are commercially available, give an indication of whether leg 38 is vertically oriented, while cylinders 40–43 are hydraulically extendable to keep leg 38 vertical. The assembly of leg 38 and cylinders 40–43 allow the use of a single leg 38, reducing the chance of contact between leg 38 and a cargo being transferred between vessel 12 and rig 10. The operation of cylinders 40–43, sensors S1, S2 and leg 38 will be discussed more fully hereinafter with respect to the hydraulic circuit of FIG. 3. The combination of the pivotal movement capabilities provided by the arm connections and the extensions/contractions of cylinders 40–43 will accommodate any movement of the vessel 12 relative to the platform 10 caused by wave motion without causing undue stress in any portion of the linkage or its connections. The pivot pin 22 accommodates lateral motion of the vessel 12 as it is shown in FIG. 1 relative to the platform 12 while the pivot pins 26 and 30, the articulated connection 36, and cylinders 40–43 accommodate longitudinal and vertical movement caused by heaving, pitching or surging of the vessel 12. The pivot connection 36 also accommodates any rolling action of the vessel 12 and/or rotation of the vessel 12. It is also to be understood, while not illustrated, that the apparatus can be installed on the vessel and temporarily attached to the stationary body for transfer of cargo. It is also to be understood that the apparatus is not limited to transferring between a stationary body and a movable body, but because of the pivotal aspects of the apparatus, between two movable bodies such as a drill ship or floating dock and a supply vessel. It is further to be understood that arms 20, 24 and 28 can be fabricated in a manner which will allow them to be extended or retracted, thereby permitting the apparatus to be adjusted for differences in height between the two bodies, because of sea conditions or because of lateral distance between the two bodies. It is also to be understood, although not illustrated, that the apparatus can be fabricated with walkways and ladders to provide for the transfer of personnel, and with hose connections to provide for the transfer of liquid cargos.

A pair of stationary guide pulleys 50 and 51, which are spaced apart a distance sufficient so that the hoist line 16 can move between them, are mounted on the first arm 20 as shown in FIG. 1. A third stationary guide pulley 52 is mounted on the pivot point 30 directly below the pulley 51. A trolley mechanism is provided on the third arm 28 in the form of a movable pulley 54 which is connected to an endless line 56 (or screw thread or cogged wheel) that extends between a pair of stationary pulleys 58 and 60 located at the opposite ends of the arm 28. An appropriate motor 62 is mounted for rotating the pulley 60 for moving the movable pulley 54 back and forth along the third arm 28 for effecting the cargo transferring operation as described in greater detail below. A counterweight 64 can be mounted on the end of the arm 28 opposite the end connected to the vessel 12.

In order to transfer cargo from the vessel 12 to the platform 10 the hoist line 16 is first lowered and then positioned between the guide pulleys 50 and 52 and in contact with the rotatable pulley 54, all of which are located on the same side of the linkage 18. The hoist line 16 is played out in cooperation with movement of the pulley 54 along the third arm 28. Engagement between the pulley 54 and the hoist line 16 operates to move the hoist line along the third arm 28 until it reaches a point shown by the broken lines and designated by the letter "A" over a cargo container 66 which is to be transferred to the platform.

The end of the hoist line 16 is appropriately connected to the container 66 while the movable pulley 54 remains in engagement with the hoist line 16. The hoist line 16 is then reeled in to clear the deck of the vessel 12 and any other objects in the way. Engagement of the hoist line 16 with the third arm 28 which is in effect an extension of the vessel 12 effectively minimizes any relative movement between the hoist line 16 and vessel 12 so that the cargo container 66 can be safely lifted regardless of wave motion imparted to the vessel.

The movable pulley 54 is moved back along the third arm 28 as the hoist line 16 is appropriately reeled in to where the hoist line 16 is vertical and the cargo container 66 is in the position indicated by letter "B." The cargo container 66 is always under control regardless of vessel movement because of engagement of the hoist line by the respective pulleys.

After position B is reached, the hoist 14 is moved laterally away from the linkage 18 so that the hoist line 16 moves from between the guide pulleys 50 and 51 and out of engagement with the guide pulley 52 so that the cargo container 66 can be lifted toward the position shown by the broken lines and indicated by the letter "C." The hoist 14 can then be maneuvered to place the cargo container 66 on the deck of the platform 10. In order to transfer material from the deck of the platform 10 to the deck of the vessel 12, the operation just described can be reversed. Guides (not shown) can be attached near pivot pins 26 and 30 to facilitate proper placement of the load line 16 when the apparatus is moving because of wave action.

After cargo transfer operations cease, the linkage 18 is disconnected from the deck of the vessel 12 by disconnecting, for example, deck connections 46. A hook (not shown) on the hoist line 16 which connects with the spring attached to ring 32 can swing the linkage 18 about the pivot pin 22 and out of the way. The arms 24 and 28 can be fabricated with telescoping sections (not shown) or with appropriate hinges (not shown) for either collapsing or folding the arms and reducing the overall size of the linkage arrangement 18 for more convenient storage.

FIG. 3 provides a schematic diagram of the hydraulic circuit portion of the preferred embodiment of the apparatus of the present invention. Shown in FIG. 3 are the plurality of hydraulic cylinders 40—43 which are affixed as shown in FIG. 2 at one end to the vessel deck and at their opposite end portions to leg 38. The pushrod 40a–43a portion respectively of each cylinder 40-43 preferably affixes to the deck of the vessel and provides the movable portion of cylinder assemblies 40-43. A motor 70 is mounted, for example, upon arm 28 for rotating pump 72 which supplies the driving force for moving hydraulic fluid throughout the circuit of FIG. 3. A valve assembly 74 shown in FIGS. 2 and 3 functions to transmit fluid as desired between respective cylinders 40-43 as will be described more fully. In FIG. 3 valve assembly 74 comprises a pair of valve assemblies 74a, 74b, each of which comprises a housing 94, 96 and an inner valving member 90-92. The valving member comprises an elongated shaft 91 upon which are disposed a plurality of spaced apart valving plugs 100. Solenoids 76–79 are disposed at the end portion of each shaft 91 and upon actuation urge shaft 91 between positions which alternately close or open the various fluid lines as shown in FIG. 3 (see arrows 98) so as to control the flow of fluid between the respective cylinders 40-43. Actuation of solenoids 76–78 is dependent upon the position of sensor S1 or S2 as shown by the curved arrows 84 in FIG. 3. Bypass valves (not shown) on cylinders 40 and 42 allow 40 and 42 to move freely when pump 72 does not provide hydraulic fluid within the system.

An alternate embodiment of the frame attachment of arm 28 to deck 12 is seen in FIG. 4. Arm 28 at its outer end portion in that embodiment provides motor 70, pump 72 and valve assembly 74 which would function as aforedescribed. Also provided in articulated connection 36 disposed upon the end portion of arm 28. An articulating frame 102 comprises a pair of spaced apart vertical legs 103, 104 which are connected at their upper portions to horizontal beams 106, 107. Bracket 108 affixes to articulating connection 36 with the end portions of beams 106, 107 respectively being affixed rigidly to bracket 108 by welding, for example, while the external end portions of each beam 106, 107 are connected to legs 103, 104 by pinned or pivotal connections. Spaced generally below beams 106, 107 and parallel thereto are pistons 110, 111 which are pivotally attached at their end portions respectively to bracket 108 and to legs 103, 104 as shown.

A second pair of hydraulic cylinders 112, 113 form extendable connections between cross-beam 116 which is rigidly affixed to arm 28 and respectively to vertical arms 117, 118 which are rigidly fixed and extend upwardly from beams 106, 107 respectively.

Each vertical leg 103, 104 provides sensors S2 which indicate vertical positioning. Bracket 108 also is provided with sensor S1 to maintain it in a vertical position. Cylinders 11–113 also maintain vertical positioning of legs 103, 104 and bracket 108 as is desired by using a hydraulic compensating circuit similar to FIG. 3 in the drawings.

FIG. 5 shows another embodiment of the connection between the platform, arm 24 and arm 28 and vessel 12.

The embodiment of FIG. 5 provides a means for locking the pivotal connection 36. The same mechanism of FIG. 5 can lock connection 26. A pair of spaced apart legs 38 are shown connected to cross-piece 34. Each leg 38 includes a base portion 40 formed with gear teeth 42 on the lower end portion thereof. The gear teeth 42 are preferably convexly curved and mesh with gear teeth 44 formed on cooperating base pads 46 rigidly mounted upon the deck of vessel 12. Locking of pivotable connections 26 is desirable when 24 is vertical to facilitate swinging load line 16 between sheaves 50, 51 and 54, 30. One plane of movement of articulated connection 36 can be locked, for example, when perpendicular to arm 28 to reduce relative movement between vessel 12 and leg 38. Both can be locked by the operator of the crane 14, for example. Preferably only one would be locked at a time and indicators S1 and S2 provided show when second arm 24 is vertical and when the position of arm 38 is perpendicular to arm 28.

With respect to articulated connection 26 and 36, a pair of hydraulic cylinders 122, 123 are mounted upon carriage 120, each cylinder providing extendable pushrods 122a, 123a. Affixed to the distal or extreme end portion of each pushrod 122a, 123a respectively is a curved, arcuate brake shoe 124, 125 which abuts and presses against brake drums 126, 127 on the end of 20 at pivotal connection 26 and on cross-piece 34 when cylinders 122, 123 are actuated with hydraulic fluid, extending pushrods 122a, 123a.

The embodiment illustrated in FIG. 6 provides line 16 with a load line drum assembly 130 which would be supported by the crane boom 14b load line 16 with the connection of assembly 130 and load line 16L being preferably at lifting hook 16H. Assembly 130 provides a drum carrier 132 within which are disposed a pair of generally parallel and spaced apart drums 134, 136 each mounted rotatably on shafts S. Fast line 16 winds upon drum 134 while heavy line 17 is wound upon drum 136. As fast line 16 is paid out, it winds upon drum 134 while heavy line 17 is unwound from drum 136 under loading by load 66. Each drum 134, 136 provides gears 140, 142 respectively which mesh so that rotation of drum 134 produces a corresponding but opposite rotation of drum 136. During operation, heavy line 17 would be initially fully wound upon drum 136 with drum 134 initially being empty when in the stowed position. The drum carrier 132 would be hooked to load hook 16H and fast line 16 would be wound upon drum 134 a small distance. Carrier 132 would be positioned above and beside second arm 24 and fast line 16 on crane 14 would be let out allowing the fast line to wrap upon drum 134. When heavy line 17 had paid out far enough it would be swung into position adjacent the sheeves as aforedescribed with respect to fast line 16 and carried out to vessel 12. Cargo 66 would then be attached to a provided hook on heavy line 17 and transfer would be completed as aforedescribed with respect to the preferred embodiment. In order to return to the initial position, fast line 16 would be drawn in fully until heavy line 17 was completely wound upon drum 136. As a variation, drum 136 could be attached to a separate motor and winch instead of to drum 134.

Another embodiment illustrated in FIG. 7 provides a separate load hook on arm 28. A staging platform P is provided on rig 10 generally below arm 20. Platform P would be designed to allow it to be moved out of the way when not in use as indicated by the arrow in FIG. 7. Heavy loads can thus be lifted directly to staging platform P and then lifted directly from staging platform P by crane 14. This allows load 66 to be lifted from vessel 12 directly to staging platform P and thus to the rig without the use of crane 14 during the initial transfer. If desired, for example, a separate sheave could be added to sheave 54 so that arm 28 would have lifting capability similar to a jib-type crane. In such a case, a winch 14a would occupy a position on arm 28 adjacent counterweight 64, extending a lift line 16a to the trolley which would provide the actual lifting capability.

In this way cargo can be transferred from the deck of a vessel onto a platform or vice-versa even during rough seas because continuous physical contact is maintained between the two bodies and compensation can be made for the relative motion of the vessel caused by wave motion by maintaining contact between the hoist line and a physical extension of the vessel. Cargo can safely and easily be hoisted and transferred because movement of the hoisting mechanism relative to the vessel is minimized through the connecting-motion compensation mechanism until the cargo is free from the influence of wave motion imparted to the vessel. Control is at all times maintained over the cargo so that it cannot break loose or swing wildly during the transfer operation. Thus, a safe and efficient way of transferring cargo between a vessel and a stationary body is provided.

Figure 8:
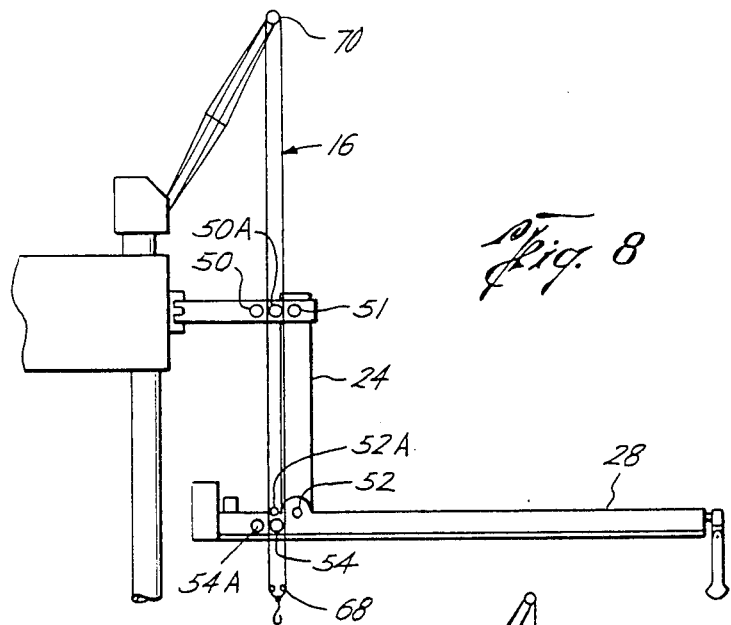
FIG. 8 is an elevational view of another embodiment of the apparatus of the present invention illustrating multi-line and traveling block portions therewith.

The embodiment of FIG. 8 could be adapted for multiline use. For example, an additional roller 52a and an additional pulley 54a would be placed adjacent pulleys 52 and 54. A separate spacer roller 50a between rollers 50 and 51 would also be provided. Thus a traveling block 68 arrangement of multi-lines could be provided depending at 70 downwardly from crane 14 and between sheaves 50 and 51 and on either side of spacer roller 50a and on either side of 54 and 52a. The pair of pulleys 54, 54a move together to carry the multi-line block and tackle arrangement outwardly. Since most offshore platforms have at least two cranes on the same side, a second crane could lift the arm 28 off the vessel to stop movement while moving the multi-lines into position between 50 and 51 and 52 and 54a. Rollers 50, 50a, 51, 52, and 52a and pulleys 54 and 54a could be a series of pulleys on the same shaft to accommodate as many reeves of line as is on the crane.

Figure 9:
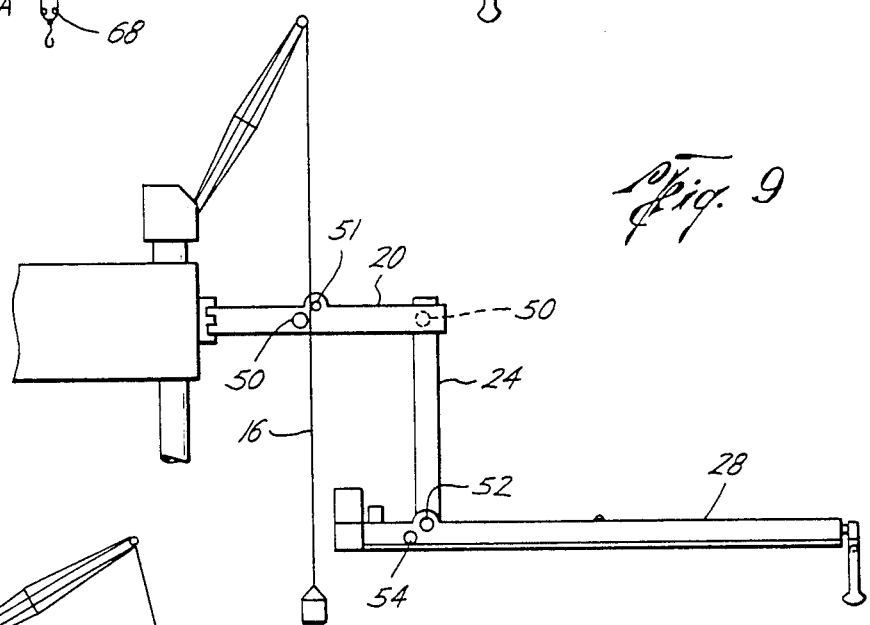
FIG. 9 is an elevational view of another embodiment of the apparatus of the present invention which allows increased boom angle and lifting capacity.

In the embodiment of FIG. 9, sheave 50 could be movably mounted upon member 20 to move in a lateral direction. This would allow crane 14 to remain "boomed up" in its highest lifting capacity position while permitting arm member 20 to be of longer horizontal dimension and arms 24 and 28 farther spaced from platform 10 allowing for more movement of 24 and 28 without hitting the platform 10. To so operate, the sheave member 50 would be in a position vertically below the tip of the boom and that sheave of the boom over which the cable lastly passes (between 50 and 51). Once sheave 50 is engaged with the load line 16, it would be moved outwardly until line 16 is positioned opposite the opening between 52 and 54 and then laterally toward the opening between sheaves 52 and 54, then the lift would be completed as aforementioned.

Figure 10:
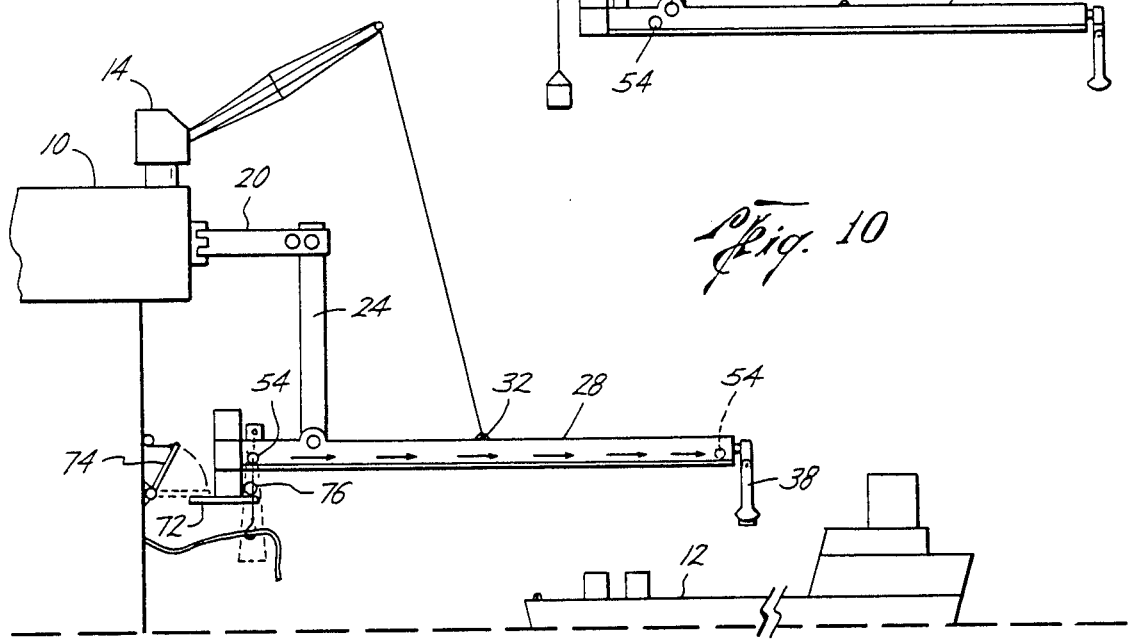
FIG. 10 is another embodiment of the apparatus of the present invention illustrating the use of an auxiliary loading platform and mooring line/messenger system for transferring generally lightweight articles to the vessel.

A mooring line messenger system as shown in FIG. 10 could be provided by having arm 28 fitted with a platform 72. A movable walkway would be pivotally attached to the platform 10 so as to engage the platform 72 of the member 28. Mooring lines, personnel baskets or small packages could then be attached to a movable pulley 54 which was carried out to the vessel 12 along the member 28, which is not lowered to the vessel 12. This would allow the vessel to anchor or otherwise maintain position without being next to the platform 72 and personnel and small packages could be transferred between the platform 10 and the vessel 12 without the vessel having to be as close to the platform as would normally be required for such transfer of personnel, equipment, and the like. During mooring and after the mooring lines on the vessel 12 were connected, the vessel 12 can move in even closer and then be moored directly to the platform. Another example of operation would be for personnel baskets, mooring lines or small packages to be attached directly to movable pulley 54 using movable walkway 74, before the arm 28 is lowered to the vessel. Movable walkway 74 could then be retracted and the arm 28 would be lowered until arm 28 is on the stern of the vessel. Movable pulley 54 would then be moved out until the cargo was upon the vessel. An escape capsule 76 could be stowed on the platform 72 from which it would be carried out to the end of the arm 28 allowing it to be dropped well clear of the platform 10. Although the movable walkway 74 is illustrated as dropping down when the arm 28 is not moving, it is to be understood that the walkway 74 could be mounted upon rollers and attached to 28 so that it rolls back and forth as the arm 28 swings after being attached to the vessel.

FIG. 11 illustrates a detachable arm which is left on the vessel which, for example, could be used for handling anchor jobs and loading on the vessel without a dockside crane. In the preferred embodiment two adjustable legs 78 are spaced apart at the end of arm 28 nearest the floating platform or drill ship 10 making pivot pin 30 removable and providing means 80 to lower the arm 28 after the pin is removed and arms 38 are upon vessel 12. The arm 28 when on the vessel would be used to lift anchors, buoys, etc. by means of trolley 54 onto vessel 12. Arm 28 could then be attached to arm 24, and the anchors lifted to the platform or drill ship as provided in the aforementioned description of lifting. In operation, a lifting eye or ring 32 would be mounted upon arm 28. The legs 38 are positioned on the deck of the vessel far enough forward so that legs 78 are above the stern of the vessel. When the legs 38 are in place, the load line 16 is disconnected from ring 32. Load line 16 is then attached to the ring on cables 84 and attached as in 80. Pivot pin 30 is removed and arm 28 lowered until the legs 78 are on the deck. Legs 78 extend enough to hold arm 28 clear of any anticipated cargo. Load line 16 is let out and cables 84 released from blocks 82. Cables 84 are left attached to the arm 24 and load line 16. Vessel 12 leaves and upon returning the process is reversed and the arm 28 raised until the pivot pin 30 is replaced. Load line 16 is then disconnected and the cables 84 removed.

In the detail, fragmented view of FIG. 11a, two cables 84 comprise element 80 with safety hooks on each end which are attached to permanent rings on the end of arm 24. Cables 84 are passed through four snatch blocks 82, two of which are permanently attached to each side of the arm 28 and then to the ring on load line 16.

A lowering device could comprise a spring installed in the line of the lifting arm allowing the arm to be pulled down against spring tension and secured to the vessel deck (see FIG. 12). In order to provide rapid retraction in event of an emergency, hydraulic cylinders are designed and positioned to lock arm 24 in a vertical position and raise arm 28 sufficiently to clear the vessel when deck connection 46 is disconnected. During normal operations, the pistons move freely.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for transferring cargo between first and second bodies which are movable relative to each other where a hoist for raising and lowering cargo through a hoist line is mounted on one of the bodies, comprising linkage means for connecting the two bodies, pivot means for pivotally connecting the linkage means to the bodies and having motion compensation means for accommodating relative movement between the bodies; and trolley means movable along at least a portion of the linkage means for supporting the hoist line, and moving the hoist line along the linkage means between the two bodies so that cargo connected to the hoist line can be moved along the linkage means from one of the bodies to the other one;

the linkage means including a first arm pivotally connected to the first body for pivotal movement through a horizontal plane, a second arm pivotally connected to the first arm for pivotal movement through a vertical plane, and a third arm pivotally connected to the second arm for pivotal movement through a vertical plane;

and secondary platform means carried by the linkage for providing a substantially horizontal planar work surface below an end portion of the third arm in the vicinity of its connection to the second arm.

2. The apparatus of claim 1, wherein the first body is stationary and the second body is a vessel floating on water.

3. The apparatus of claim 1, wherein the pivot means includes an articulated connection supporting at least one leg connected at one end to the articulated connection and at the other end to the second body, a plurality of hydraulic cylinders mounted on the linkage in part compensating motion between the leg and second body.

4. The apparatus of claim 3, wherein the hydraulic cylinders are each movably connected at one of their ends to the leg and at their other ends to the second body.

5. The apparatus of claim 1, and further including a first rotatable guide pulley mounted on one side of the third arm and a pair of rotatable stationary guide pulleys spaced apart by at least the diameter of the hoist line and mounted on the linkage means above the first pulley.

6. The apparatus of claim 1, wherein the trolley means includes a rotatable support means movable along the third arm for supporting the hoist line, the support means connected to an endless line, a pair of rotational, stationary, support means for supporting the endless line mounted at opposite ends of the third arm, means for rotating at least one of the stationary support means for moving the endless line.

7. The apparatus of claim 3 further comprising leveling means for biasing the leg toward a vertical position.

8. The apparatus of claim 7, wherein said biasing means comprises fluid drive means for transferring fluid between the hydraulic cylinders to adjust the angle between the leg and the second body.

9. The apparatus of claim 8, wherein said fluid drive means comprises:
   sensing means to indicate a nonvertical position of the leg,
   fluid bypass means for forming a fluid flow connection between the various hydraulic cylinders,
   pump means for transferring fluid between the various cylinders through the bypass means, and
   valving means for controlling fluid flow direction in the fluid bypass means.

10. The linkage of claim 8, wherein the pivot means includes a pair of spaced apart legs pivotally connected at one of their ends to the third arm for accommodating rotational and rocking movement of the legs relative to the third arm, the legs connected at their other ends to the second body, and further comprising stabilizing means for urging the legs into a vertical position.

11. The linkage of claim 8, wherein the trolley means includes a trolley movably mounted on the third arm.

12. The linkage of claim 10, wherein the second and third arms are removably connected together and the third arm provides support at each end portion thereof so that disconnection of the removable connection allows the third arm to be supported on the second body.

13. An apparatus for transferring cargo between first and second bodies which are movable relative to each other where a hoist for raising and lowering cargo through a hoist line is mounted on one of the bodies, comprising:
   linkage means for connecting the two bodies;
   pivot means for pivotally connecting the linkage means to the bodies and having motion compensation means for accommodating relative movement between the bodies;
   trolley means movable along at least a portion of the linkage means for supporting the hoist line, and moving the hoist line along the linkage means between the two bodies so that cargo connected to the hoist line can be moved along the linkage means from one of the bodies to the other one;
   the linkage means including a first arm pivotally connected to the first body for pivotal movement through a horizontal plane, a second arm pivotally connected to the first arm for pivotal movement through a vertical plane, and a third arm pivotally connected to the second arm for pivotal movement through a vertical plane;
   the pivot means including an articulated connection supporting at least one leg connected at one end to the articulated connection and at the other end to the second body;
   a plurality of hydraulic cylinders mounted on the linkage in part compensating motion between the leg and second body;
   leveling means for biasing the leg toward a vertical position, the biasing means including fluid drive means for transferring fluid between the hydraulic cylinders to adjust the angle between the leg and the vessel deck;
   the trolley means including a trolley movably mounted on the third arm.

* * * * *